United States Patent [19]

Davison

[11] Patent Number: 4,742,853

[45] Date of Patent: May 10, 1988

[54] PRECISION ROUTER GUIDE

[76] Inventor: Daniel M. Davison, 2017 E. Sante Fe, Fullerton, Calif. 92631

[21] Appl. No.: 885,174

[22] Filed: Jul. 14, 1986

[51] Int. Cl.$^4$ ............................................. B27C 5/00
[52] U.S. Cl. ..................................... 144/137; 33/197; 33/562; 144/144 R; 144/144.5
[58] Field of Search ....................... 144/83, 84, 85, 87, 144/144 R, 144.5, 137; 33/562, 197

[56] References Cited

U.S. PATENT DOCUMENTS

| | | | |
|---|---|---|---|
| 1,860,319 | 5/1932 | Lawson et al. | 144/144.5 |
| 2,652,866 | 9/1953 | Drain | 33/562 |
| 2,838,838 | 6/1958 | Lica | 144/144.5 |
| 3,875,670 | 4/1975 | Hudgins | 144/144.5 |
| 4,062,123 | 12/1977 | Lundquist | 33/562 |
| 4,392,307 | 7/1983 | Wightman, Jr. | 33/197 |

*Primary Examiner*—W. Donald Bray

[57] ABSTRACT

A precision router guide is described which is specifically configured for cutting or routing out slots of different widths in panels, boards or the like. The precision router guide includes a plurality of frame members pivotally joined together near their respective extremities to form a parallelogram wherein two of the frame members are longer in length than the other pair of oppositely disposed frame members and have straight edges and are disposed in edge-to-edge facing parallel relationship, securing means for securing one of the frame members to the workpiece thereby placing the frame member in relatively fixed relationship thereto, gauge means adapted to operably set a specific reference displacement between the longer of the frame members whereby the distance between the respective gauge means establishes the precise width of the routers cutting swath on the workpiece, locking means for locking at least one of the pivoting joints of the parallelogram following the use of the gauge means whereby the distance between the two longer in length frame members remains fixed while the router's base plate is operably disposed in intimate guiding relationship between the pair of fixed frame members so that the router's cutter is precisely positioned to cut the slot desired in the workpiece.

9 Claims, 2 Drawing Sheets

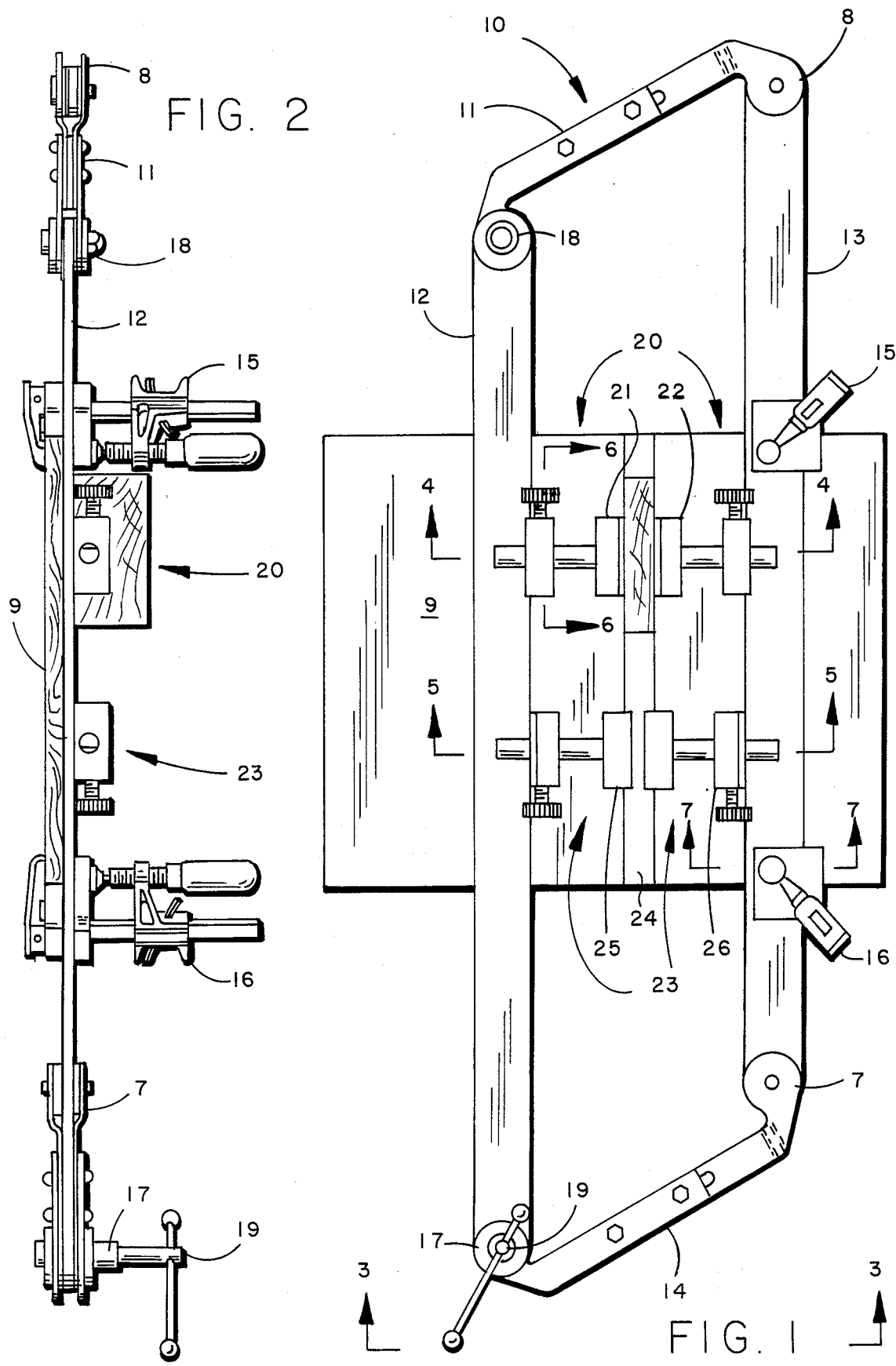

PRECISION ROUTER GUIDE

BACKGROUND OF THE INVENTION

1. Field of the Invention:

The present invention relates to a precision router guide, and more particularly, to a novel and improved method and apparatus for guiding a router in the formation of slots of different widths, such as in the construction of wooden shelving for edge-wise joining of the shelves thereto and therein.

2. Description of the Prior Art:

Carpentry work frequently requires the formation of the tongue and groove or dado joint which provides a strong joining means for perpendicular configurations. The Rabbit Joint used for corner applications may be considered as a one sided dado joint and is formed in a similar manner. Both of these joints are commonly formed with the dado head cutter in conjunction with a table saw or radial arm saw. While this means is effective, particularly for production applications, it lacks the portability, flexibility, safety and economy that is required by many carpenters. The introduction of the high speed router has made it possible to form the dado and rabbit joints without these restrictions provided that a convenient guiding means could be developed.

One device which characterizes the prior state of the art in this regard is disclosed in U.S. Pat. No. 3,967,665 which is referred to as an adjustable routing template. It should be noted however, that this particular prior art device will not:

(1) Provide a uniform in depth cut if the material to be routed is not flat, or is warped.

(2) Provide an accurate router cut to trim the workpiece at any angle by means of a straight external edge.

(3) Provide an accurate router cut to cut a notch along the edge of the workpiece to create a rabbit joint.

(4) Provide a depth of router cut which may be determined without compensating for the router guide frame thickness.

(5) Provide an automatic, consistent means of inherently maintaining the router guide frame members in constant parallel relationship.

(6) Provide a means for positioning the router guide squarely or at some other angle with respect to the workpiece by means of a calibrated square or protractor.

(7) Provide a means for guiding the router without utilizing a guide bushing. A guide bushing restricts the versatility of the router and is generally not installed unless specifically required.

(8) Provide relatively unobstructed visual and manual access to the workpiece without any substantial interference from the adjustable router guide;

(9) Provide a simple calibration procedure for gauging the frame member spacing and position relative to the desired cut location; and

(10) Provide a tool that is accurate, compact, rugged and convenient to use.

Because of these deficiencies in the prior art, router guides for cutting dado and rabbit joints are not widely used and, in fact, are generally unavailable. This situation will only be rectified if the state of the art is advanced to such an extent that these deficiencies are overcome.

SUMMARY OF THE INVENTION AND OBJECTS

Basically, the instant invention may be described as a precision router guide which is specifically adaptable for cutting and routing out slots of different widths in panels, boards or the like. The slots can be routed out on inclined surfaces or at any angle with respect to the workpiece. This precision router guide includes a plurality of straight frame members pivotally joined together at their respective extremities to form a parallelogram wherein two of said frame members are longer in length than said other of said frame members and are disposed in edge-to-edge facing parallel relationship, securing means for securing one of said frame members to the workpiece thereby placing said frame member in relatively fixed relationship thereto, gauge means adapted to operable set a specific reference displacement between the pair of longer in length frame members whereby the gauge means establishes the precise width of the router's cutting swath on the workpiece, and locking means for locking one of the pivoting joints of the parallelogram wherein when said gauge means is removed following its use, the outer rim of the router's base plate is operably disposed in intimate guiding relationship between said pair of longer in length frame members, and the router's cutter is precisely positioned to cut the slot desired in the workpiece.

One important and primary object of the invention described herein to provide a precision router guide which will allow the router base to contact the workpiece directly thus providing a depth of router cut that is relatively independent of the degree of flatness of the workpiece.

A yet still further primary and important object of the invention is to provide an accurate router cut to trim the workpiece at any angle by means of an external straight edge that may be adjusted in translation without disturbing its angular orientation with respect to the workpiece.

It is a yet still further and important object of the invention to provide a means for cutting a notch along the edge of the workpiece to create a rabbit joint.

Another object of the within described invention is to provide a depth of router cut which is equal to the distance that the router cutter projects below the router base plate.

Another equally important and primary object of the invention described and disclosed herein is to provide a precise and consistent means of inherently maintaining the router guide frame members in constant parallel relationship.

It is an object of the within invention to provide a means for positioning the router guide squarely or at some angle with respect to the workpiece by means of a calibrated square or protractor.

Another primary and important object of the invention is to provide for operation without the requirement that a guide bushing be attached to the router. This will allow the router to be used in its normal configuration.

It is a yet still further important and primary object of the within invention to provide for relatively unobstructed visual and manual access to the routed area of the workpiece without substantial interference from the precision router guide.

Another primary and significant object of the present invention is to provide a simple calibration procedure for gaging the frame member spacing and positio relative to the desired cut location.

It is an object of the invention to provide for an adjustable, accurate, and compactly rugged precision router guide.

These and other objects and advantages of the present invention will become apparent to those skilled in the art upon consideration of the following detailed description of the preferred embodiment thereof; reference being made to the accompanying drawings, herewith, wherein:

BRIEF DESCRIPTION OF THE DRAWINGS

FIG. 1 is a plan view of the precision router guide.

FIG. 2 is a front elevation view of the present invention as shown in plan view form in FIG. 1.

DESCRIPTION OF THE PREFERRED EMBODIMENT OF THE INVENTION

Figure 3:
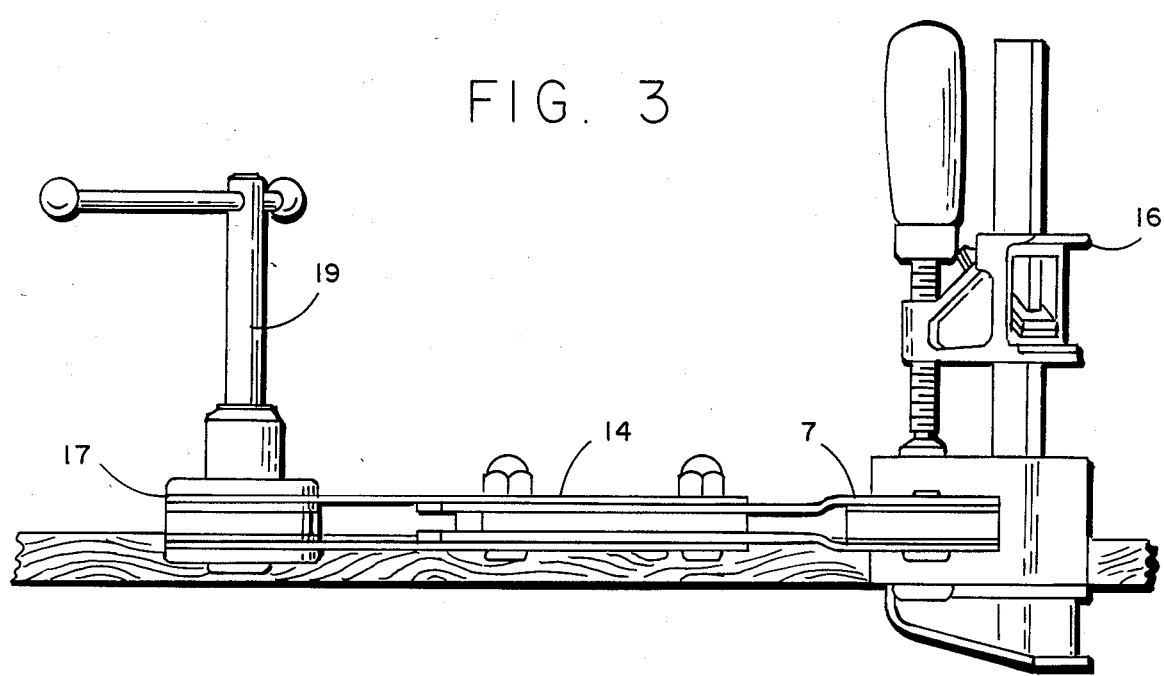
FIG. 3 is a side elevational view of the present invention taken along Plane 3—3 of FIG. 1.

With continued reference now to all of the Drawings herein, and with special emphasis now on FIG. 1, there is generally indicated at 10 the present invention which is generally referred to as a precision router guide. The precision router guide 10 is adapted for use in conjunction with a router for routing out slots in a workpiece, typically, but not necessarily, consisting of wood, and comprises a plurality of frame members 11, 12, 13 and 14, formed of relatively flat material, preferrably made of a metallic substance such as steel or aluminum, all of which are pivotally joined together near their respective extremities to adaptively form, in combination, a parallelogram wherein typically two of said frame members 12, 13 are longer in length than the other of said frame members 11, 14, and each of the pairs of frame members 11, 14 and 12, 13 are disposed in edge-to-edge facing parallel relationship, securing means 15, 16 for securing at least one of said longer in length frame members 13 to the workpiece 9, thereby fixing said frame member 13 in relatively stationary relationship thereto, gauge means, generally indicated at 20, said gauge means 20 consisting, in this particular embodiment of the invention herein, of a pair of lengthwise adjustable members 21, 22 adapted to operably set a specific reference displacement from the pair of longer in length frame members 12, 13 whereby the distance between the respective gauge means 21, 22 establishes the precise width of the router's cutting swath on the workpiece 9, and locking means 17 for locking at least one of the pivoting joints 7, 8, 18 or 19 (here in FIG. 1 the locking means 17 is shown in operative conjunction with only one of the pivoting joints 19), so that when the gauge members 21, 22 are removed following their use and the outer edge of the router's base plate is operably disposed in intimate guiding relationship against the inwardly facing edges of the frame members 12, 13, the router's cutter is precisely positioned to cut the slot desired.

It should be noted at this time that each of the pair of frame members 11, 14 are adjustable in length, the purpose being to provide a means whereby the parallelogram may be optimally adapted to the various router models, each of which may have a different base plate diameter. The procedure for effecting this adjustment is given in a subsequent section entitled "Procedure for Setting the Routrite Bar Spacing and Gauges".

The locking means 17 comprises a relatively uncomplicated shaft with a threaded portion thereon and a turnstile-type handle 19 as shown in FIG. 3. As the turnstile-type handle 19 is manually rotated, the washer 27, as shown illustrated in FIG. 2, the apertured portion of which is unthreaded, is drawn into or loosened when the headed portion disposed at the opposite end of the shaft from the handle 19 is moved towards the frame members 12, 14, or, alternatively, away from said frame members 12, 14, all as depicted in FIGS. 1 and 3.

OPERATION AND APPLICATION OF THE INVENTION

The precision router guide referred to hereafter as the "Routrite" is simple in design and easy to use. It greatly enhances the usefulness of the portable router by providing a means for easily and precisely controlling the position and width of the router cut for dado and rabbit joint applications. The following explanation provides step by step instructions on how to use the Routrite to cut these common joints.

Figure 5:
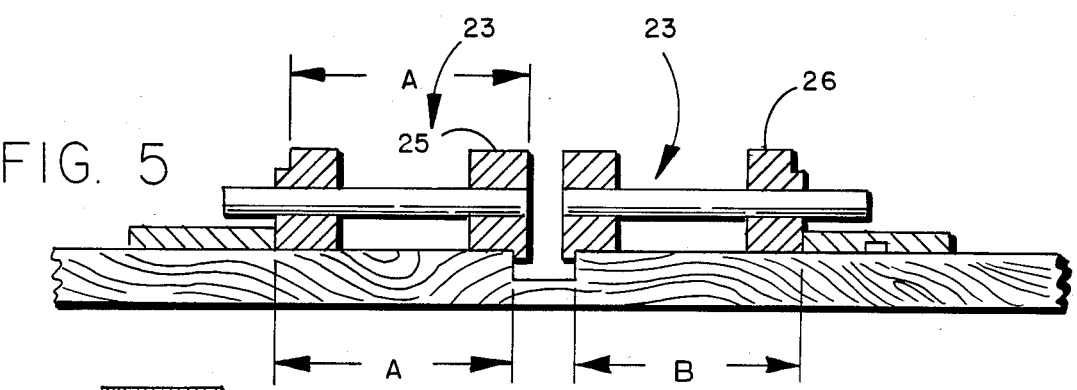
FIG. 5 is a view of the present invention taken along Plane 5—5 of FIG. 1.
Figure 6:
FIG. 6 is a view of a portion of the present invention taken along Plane 6—6 of FIG. 1.
Figure 7:
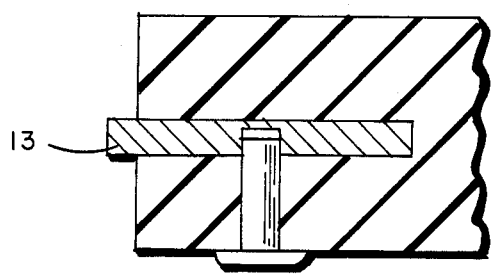
FIG. 7 is a view of a portion of the present invention taken along Plane 7—7 of FIG. 1.

All applications of the portable router require that the cutting tool be guided by some means during the cutting process. For cutting precision slots or notches, the guiding mechanism will usually consist of templates or straight edges that will restrict the cutter motion to a specific domain or area of the workpiece. In those cases where cuts are made on or near an edge, the edge itself may be used as a guide. The guiding points on the router, depending on the application may be either the router base or a fence attached to the base, a guide bushing or a non-cutting portion of the router bit. When using a portable router to cut the common dado joint, double parallel straight edges are typically used. This technique will provide a width of cut equal to the diameter of the cutter plus the "free play" between the router base and the two straight edges. The position of the cut will depend on the location of the cutter relative to one of the guiding points on the router base. More specifically, for purposes of further discussion, let us choose an arbitrary point on the outer edge of the router base and designate it as the "primary base point." In the special case where the base is concentric with the cutter, all points around the base may be considered as primary since all are equidistant from the cutter. We will then designate one of the frame members as the "primary guide bar" (we will use frame member 13 as shown in FIG. 1 as our primary frame member since it clamps to the workpiece and is located first). Referring now to FIG. 5, it is evident that if a cut is made while holding the primary base point against the primary frame member 13, the distance B may be defined as the "primary distance", and gauge 26 as the primary gauge. In like manner, we may define a "secondary base point" which will be opposite the primary, a secondary frame member 12, a secondary distance (A) and a secondary gauge 25.

PROCEDURE FOR SETTING THE ROUTRITE FRAME MEMBER SPACING AND GAUGES

The spacing between frame members 12 and 13 may be changed by either of two means. The "primary means" is to open or close the parallelogram through a range that extends from its rectangular configuration or "open spacing" to the closed configuration where frame members 12 and 13 are in contact, The "secondary means" is to extend or retract the lengthwise adjustable frame members 11 and 14 in such a way that the "open spacing" is increased or decreased while maintaining the parallelism of frame members 12 and 13.

With regard to the "Procedure For Setting the Routrite Frame Member Spacing" mentioned in the title of this section, the "secondary means" is refered to and will be discussed in detail subsequently.

As mentioned previously, the width of cut obtained with a double guide system and router will be equal to the diameter of the cutter plus the "free play" between the router base and the guiding edges. The "free play" and therefor the cut width will be maximum when the Routrite is in its rectangular configuration. In this case, the diameter of the router base plus the "free play" will equal the "open spacing". The "open spacing" is therefor an important dimension since for a given router base diameter and cutter size, it determines the maximum width of cut obtainable. narrower cuts may be made by closing the parallelogram (primary means) thereby reducing the "free play". The "open spacing" required will be equal to the diameter of the router base plus the maximum desired width of cut minus the diameter of the cutter. To adjust the "open spacing", firstly loosen the locking nuts on the adjustable frame members 11 and 14, and then placing the Routrite in its rectangular configuration, extend or retract the adjustable frame members 11 and 14 until the correct "open spacing" measurement is achieved.

It should be noted at this point that in changing the lengths of the adjustable frame members 11 and 14, the parallelism between frame members 12 and 13 will be degraded to some degree. Since it would be difficult and impractical to attempt to restore parallelism by measurements alone, a simple procedure based on the geometry of the parallelogram is employed instead. After the "open spacing" has been correctly set, the locking nuts on adjustable frame member 11 are retightened. This fixes the length of frame member 11 while retaining the adjustability of frame member 14. The Routrite is now closed using the "primary means" and at the same time, adjustable frame member 14 is allowed to extend or retract as required until frame members 12 and 13 are in intimate contact. At this point, frame members 12 and 13 are parallel and the locking nuts on adjustable frame member 14 are tightened. the "open spacing" should now be correct and frame members 12 and 13 will be parallel throughout their entire range of motion as required by the geometry of a parallelogram.

The Routrite is now clamped to a piece of scrap material as shown in FIG. 1 and the frame member locked with corner lock 19 at a width greater than the diameter of the router base. After marking a primary base point on the router, a trial cut is made with the primary base point in contact with the primary frame member and subsequently a cut is made with the secondary base point (opposite the primary point) against the secondary frame member. Then without changing the settings, the primary and secondary gauges are set as shown in FIG. 5 (the gauges should be color coded or marked so they are not confused). We note that the gauges may be set from the router base directly if so desired by hooking the lip of the gauge over the edge of the router at the appropriate pont and gauging the distance to the cutter. Once the primary and secondary distances have been captured by the gauges, the Routrite may be moved to the workpiece. After this set up procedure has been completed and the gauges set, no further adjustments are required as long as the primary and secondary distances remain constant (changing the size of the cutter will require the gauges to be reset).

PROCEDURE FOR CUTTING A DADO JOINT

Figure 4:
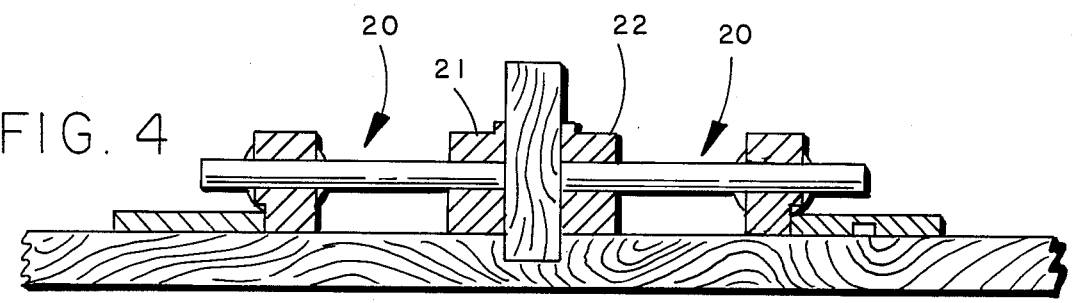
FIG. 4 is a view of the present invention taken along Plane 4—4 of FIG. 1.

The position of the dado cut is marked with a single line on the primary side of the cut (the side toward the primary frame member). The Routrite is then positioned using the primary gauge as shown in FIG. 4, note that the upper and lower surfaces of gauges 21, 22 are offset horizontally so that they may be used to gauge both an interior/exterior dimension as shown in FIG. 5, and an interior/interior dimension as shown in FIG. 4. It should also be observed that the dimension gauged, will be equal in both cases and that the gauge positions in FIG. 4 are obtained by turning the gauges in FIG. 5 upside down. In this position, the primary gauge may be used to position the primary frame member a primary distance from the line. After positioning and clamping the primary frame member, a scrap of the material to be dadoed in 28 may be used to space the two gauges. Alternatively, the gauges may be spaced by measuring the opening between them. When the gauge spacing is correct and the secondary frame member has been moved into contact with the secondary gauge, the corner lock 19 is locked and the cut is made taking care that contact between the router base and the primary frame member occurs at the primary point and that contact between the router base and the secondary frame member occurs at the secondary point. As noted before, in the special cae where the router base is concentric with the cutter, all router base points are equivalent and therefore specific base points are not required.

PROCEDURE FOR CUTTING A RABBIT JOINT

After obtaining the primary gauge setting desired above, the rabbit joint is marked with a single line the required distance from the edge of the workpiece. For the rabbit joint, the outside edge of the secondary frame member 12 is used as an adjustable straight edge for guiding the router. After locking the corner lock 19, the primary gauge is used to space the frame member 12 a primary distance from the line and then the Routrite is clamped to the workpiece. The rabbit joint is formed by holding the primary base point against the outside of the secondary frame member as the cut progresses. Adjustment in the cut width may be easily made by unlocking the corner lock 19, moving the secondary frame member as needed and relocking the parallelogram. This technique is useful not only for cutting rabbit joints but for edgework in general including trimming.

It will be understood that the above description gives an illustrative embodiment of the present invention, and that the invention is not limited to the specific forms shown. It should be clearly understood that certain obvious modifications will readily occur in the design and arrangement of the elements to those skilled in the art to which the instant invention pertains without departing from the spirit of the invention as expressed in the appended claims.

What is claimed is:

1. A precision router guide apparatus for use in conjunction with a router for routing out slots in a workpiece comprising:
    (a) a plurality of frame members pivotally joined together near their respective extremities to form a parallelogram wherein said frame members are operably disposed in edge-to-edge facing parallel relationship, so that when the router is operably disposed therebetween the opposing edges of the rim of the router's base plate may be guidingly movable therebetween;
    (b) securing means for securing at least one of said frame members to the workpiece thereby operably fixing said secured frame member(s) in relatively fixed relationship to said workpiece; and
    (c) pivot locking means for locking at least one of the four pivoting joints of the parallelogram.

2. The router guide apparatus of claim 1 further including a pair of gauge devices adapted to operably set a specific reference displacement from each of the two longer in length frame members whereby the distance between the respective gauge devices establishes the precise width of the router's cutting swath on the workpiece so that following the use of said gauge devices, at least one of the pivoting joints, may be locked thereby establishing a pair of parallel guides consisting of the longer in length frame members whereby when the router base plate is operably disposed therebetween, the outer rim of the router's base plate is operably disposed in intimate guiding relationship between said pair of frame members forming said parallel guides so that the router's cutter is precisely positioned to cut the slot desired in the workpiece.

3. The precision router guide of claim 2 wherein each of said frame members are configured in the shape of a relatively flat blade.

4. The precision router guide of claim 3 wherein one of the pair of oppositely-disposed frame members are longer in length than said other pair of oppositely-disposed frame members.

5. The precision router guide of claim 4 wherein said securing means consists of a pair of clamps which clamp opposite ends of one of the frame members in relatively fixed relationship to the workpiece.

6. The precision router guide of claim 5 wherein said pivot locking means includes locking at least one of said pivoting points of said frame members to fix the parallelogram formed by said frame members.

7. The precision router guide of claim 6 wherein the shorter pair of said frame members include means for lengthwise adjustment.

8. The precision router guide of claim 7 further including locking means for said lengthwise adjustment means.

9. The precision router guide of claim 2 wherein said gauge means consists of a pair of lengthwise extensible devices each having:
    (a) a pair of block elements having a pair of oppositely-disposed vertical faces with appropriate horizontal offsets;
    (b) structural means for operably linking the pair of block elements;
    (c) adjustment means for varying the displacement between the pair of block elements;
    (d) locking means for locking the adjustment means after obtaining the desired displacement between the pair of block elements.

* * * * *